United States Patent
Tsukamoto et al.

[11] Patent Number: 5,842,435
[45] Date of Patent: Dec. 1, 1998

[54] INDEX FOR A MEASURING INSTRUMENT

[75] Inventors: Sakae Tsukamoto; Hideo Ishihara, both of Shizuoka-ken, Japan

[73] Assignee: Yazaki Corporation, Tokyo, Japan

[21] Appl. No.: 508,883

[22] Filed: Jul. 28, 1995

[30] Foreign Application Priority Data

Jul. 28, 1994 [JP] Japan .................................. 6-176659

[51] Int. Cl.⁶ .................................................. G01D 11/28
[52] U.S. Cl. ............................ 116/288; 116/286; 362/26
[58] Field of Search ...................................... 116/286, 288, 116/328, DIG. 6, DIG. 36, 287, 284, 305, 327, 330, 331, 332; 362/23, 26, 27, 28, 29, 30, 31

[56] References Cited

U.S. PATENT DOCUMENTS

| 4,300,470 | 11/1981 | Furukawa ................................. | 116/288 |
| 4,860,170 | 8/1989 | Sakakibara et al. ....................... | 362/26 |
| 4,878,453 | 11/1989 | Inoue et al. ................................ | 116/288 |
| 5,143,016 | 9/1992 | Fournier ................................... | 116/328 |
| 5,143,434 | 9/1992 | Ohta et al. ................................ | 116/286 |
| 5,211,128 | 5/1993 | Katoh et al. .............................. | 116/332 |
| 5,458,082 | 10/1995 | Cookingham ............................ | 116/288 |

FOREIGN PATENT DOCUMENTS

| 2231657B2 | 1/1974 | Germany . | |
| 3425029A1 | 1/1985 | Germany . | |
| 3347014A1 | 7/1985 | Germany . | |
| 4015670A1 | 11/1991 | Germany . | |
| 55-97595 | 7/1980 | Japan . | |
| 56-114497 | 9/1981 | Japan . | |
| 4-64568 | 10/1992 | Japan . | |
| 626891 | 2/1994 | Japan . | |
| 6288793 | 10/1994 | Japan ..................................... | 116/288 |

OTHER PUBLICATIONS

Patent Abstracts of Japan, 28 Apr. 1994, P–1732, vol. 18, No. 235, 6–26 891. JP 6–26891A.

*Primary Examiner*—Diego F. F. Gutierrez
*Assistant Examiner*—Andrew Hirshfeld
*Attorney, Agent, or Firm*—Wigman, Cohen, Leitner & Myers, P.C.

[57] ABSTRACT

Index for use in measuring instruments includes a main body formed with a transparent synthetic resin and having an indicating portion for indicating measured values; a skirt portion formed on the base of the main body with the same transparent synthetic resin as that of the main body and having a hole through which the distal end of an index shaft of a movement element from the measuring instrument is inserted; a balancer disposed on a side opposite to that of the indicating portion and over the skirt portion with a synthetic resin blended with a high specific gravity material for adjusting the balance to the indicating portion; and a cap formed with a non-transparent synthetic resin for covering the base portion of the main body and balancer.

5 Claims, 4 Drawing Sheets

INDEX FOR A MEASURING INSTRUMENT

BACKGROUND OF THE INVENTION

1. Technical Field

This invention relates to an index used for measuring instruments, and particularly to an index having a balancer.

2. Description of the Related Art

A known index of this type includes a main body formed with a transparent synthetic resin, a cap formed with a non-transparent synthetic resin, and a balancer formed by pressing with a metal material having a relatively large specific gravity, such as brass. In the process for manufacturing this index, the main body, cap and balancer are produced separately.

For assembling these parts manually or using an automatic assembling machine, a pin raised from the bottom of the cap is inserted through through-holes both in the balancer and in the base of the main body, and the head of the pin is then heat-caulked or welded with the balancer being held between the bottom of the cap and the base portion of the main body. Also, on the central portion of the bottom of the cap, a skirt portion is integrally molded and raised so as to be inserted into another through-hole in the base of the main body. The skirt portion is provided with a hole through which the distal end of a shaft from the measuring instrument for supporting the index will be inserted.

Namely, in the conventional index described above, the respective parts are prepared separately and assembled together after all of their forming and pressing processes. Therefore, the manufacturing cost is generally high. Additionally, the index is likely to be unbalanced because of deviations in the assembly of these parts and eccentricity of the main body as well as, difficulty in controlling the heat-welding process. Thus, such unstable movement of the index tends to make a noise due to contact of the parts, thereby degrading the quality.

Such inconvenience can be partly solved by an index structure suggested by, for example, Japanese Patent Application for Disclosure (SHO)59-175122 in which the aforementioned unstable movement, including eccentricity of the index, is significantly suppressed by insert molding for integrally assembling the metal balancer with the index main body. In this improvement, however, the metal mold must be changed for the weight adjustment of the metal balancer. That is, the metal balancer must be placed so as to be insert-molded at each fixed position in the metal mold for each weight adjustment.

SUMMARY OF THE INVENTION

Therefore, it is an object of the present invention to provide an index used for measuring instruments, which does not require the assembling process, and can solve the problems, of the prior art including deviations and eccentricity in the index assembly body and quality degradation by noise occurrence. Also, the index according to this invention allows low-cost adjustment of the balance.

Another object of this invention is to provide an index used for measuring instruments, which does not require the assembling process and allows excellent workability and low manufacturing cost without causing index unbalance, noise and degradation of quality.

To achieve the above object, the index used for measuring instruments according to the present invention comprises a main body formed with a transparent synthetic resin and having an indicating portion for indicating measured values, a skirt portion formed on the base of the main body with the same transparent synthetic resin as that of the main body and having a hole through which the distal end of an index shaft of a measuring instrument is inserted with pressure, and a balancer formed with a synthetic resin blended with a high specific gravity material within the main body on a side opposite to that of the indicating portion over the skirt portion for balancing the indicating portion. The main body, skirt portion and balancer are integrally molded into a multiple configuration.

Additionally, the index further comprises a cap formed with a non-transparent synthetic resin for covering the base of the main body and the balancer, the cap, main body, skirt portion and balancer being integrally molded into a multiple configuration.

Further, a light receiving face extending vertically downward in parallel with the skirt portion is provided on the base of the main body covered with the cap to introduce light for illuminating the indicating portion on the opposite side to the balancer over the skirt portion.

To achieve the above object, the method of manufacturing the index according to the present invention comprises a first process in which a first cavity mold is placed on a core mold to form a cavity into which a synthetic resin blended with a high specific gravity material or a transparent synthetic resin is cast to produce the balancer or the main body and skirt portion, and a second process in which a second cavity mold is placed on the core mold in place of the first cavity mold with the balancer or the main body and skirt portion produced in the first process being still placed thereon to form a cavity into which the transparent synthetic resin or the synthetic resin blended with the high specific gravity material is cast to produce the main body and skirt portion or the balancer. In this manner the main body, skirt portion and balancer are integrally molded into a multiple configuration through the series of processes.

Alternatively, the method of manufacturing the index, according to this invention, comprises a first process in which a first cavity mold is placed on a core mold to form a cavity so that a synthetic resin blended with a high specific gravity material or a transparent synthetic resin is cast in the cavity to produce the balancer or the main body and skirt portion, a second process in which a second cavity mold is placed on the core mold in place of the first cavity mold with the balancer or the main body and skirt portion produced in the first process being still placed thereon to form a cavity so that the transparent synthetic resin or the synthetic resin blended with the high specific gravity material is cast in the cavity to produce the main body and skirt portion or the balancer, and a third process in which a third cavity mold is placed on the core mold in place of the second cavity mold, with the balancer or the main body and skirt portion produced in the first process and the main body and skirt portion or the balancer produced in the second process being still placed thereon to form a cavity so that a non-transparent synthetic resin is cast in the cavity to produce the cap. In this manner the main body, skirt portion, balancer and cap are integrally molded into a multiple configuration through the series of processes.

Additionally, the method according to the invention includes a step of transferring a layer for forming a colored layer onto the molding face of the core mold for forming the bottom face of the indicating portion of the main body or onto the molding face for forming the top face of the indicating portion in the first or second cavity mold before the first or second process for forming the main body and skirt portion by casting the transparent synthetic resin into the cavity to be formed by placing the first or second cavity mold on the core mold.

The core mold includes a recess for forming the skirt portion and a mold pin raised from the bottom of the recess, and the first or second cavity mold is provided with a pin receiving hole for receiving the distal end of the mold pin.

In the structure of the index of this invention, since the transparent main body, skirt portion and balancer are integrally molded into a multiple configuration, there is no need to assemble these components after preparing them separately. Therefore, the manufacturing cost can be reduced for the elimination of these processes. Further, unbalance in the index and noise due to its unstable movement can be suppressed almost completely because deviations and eccentricity to be caused by that assembling can be avoided. In addition, the integral molding into a multiple configuration of the balancer to the main body and skirt portion can provide an accurate mutual positional relation therebetween so that desired balance of the entire index structure can be well reproduced. Further, the balance can be well controlled, without changing the index shape or size, by selecting and adjusting the specific gravity of the high specific gravity material to be blended with the synthetic resin for forming the balancer or by changing combinations of the specific gravities or blending ratios of the respective high specific gravity materials.

Further, since the cap comprising a non-transparent synthetic resin is also molded integrally with the balancer and the main body and skirt portion, there is no need to assemble the cap into the emission-type index. Therefore, the manufacturing cost can be reduced as a result of the elimination of the process. Further, unbalance in the index structure and noise due to its unstable movement can be suppressed almost completely because deviations and eccentricity to be caused by that assembling can be also avoided.

Also, since the light receiving face extending vertically downward in parallel with the skirt portion is provided on the base of the main body covered with the cap to introduce light for illuminating the indicating portion on the opposite side to the balancer over the skirt portion, the light can be introduced with high efficiency directly to the indicating portion through the light receiving face.

In the method of this invention, since the main body, skirt portion and balancer are integrally molded into a multiple configuration through the series of processes described above, the processes of separately preparing the respective parts and of assembling them thereafter can be eliminated. Therefore, the manufacturing cost can be reduced for that elimination. Further, unbalance in the index structure and noise due to its unstable movement can be suppressed almost completely because of avoidance of deviations and eccentricity to be caused by that assembling.

The integral molding into a multiple configuration using the same material of the balancer to the main body and skirt portion assures an accurate mutual positional relation therebetween so that desired balance of the entire index structure can be well reproduced. Also, the balance can be well controlled, without changing the shape or size of the index structure, by selecting and adjusting the specific gravity of the high specific gravity material to be blended with the synthetic resin for forming the balancer, or by changing combinations of the specific gravities or blending ratios of the respective high specific gravity materials.

Further, since the cap is also molded integrally with the balancer and the main body and skirt portion, there is no need to prepare the cap and then assemble it into the index structure. Therefore, the manufacturing cost can be reduced as a result of the elimination of that process. Further, unbalance and noise due to deviations in setting components and unstable movement by the assembled index structure can be avoided.

Also, in the series of processes for the integral molding, the indicating portion can be colored through a step of transferring a layer for forming a colored layer onto the molding face of the core mold for forming the bottom face of the indicating portion of the main body or onto the molding face for forming the top face of the indicating portion in the first or second cavity mold before the first or second process for forming the main body and skirt portion by casting the transparent synthetic resin into the cavity to be formed by placing the first or second cavity mold on the core mold.

The core mold includes a recess for forming the skirt portion provided with a hole in which a shaft from the measuring instrument will be inserted and a mold pin raised from the bottom of the recess, and the first or second cavity mold for forming the index main body or skirt portion has a pin receiving hole for holding the distal end of the mold pin. Namely, transformation of the mold pin by the flowing pressure of the resin to be cast into the cavity for forming the main body and its skirt portion can be prevented. Therefore, even if the mold pin is relatively thin or the inner diameter of the hole to be formed by the pin is relatively small, loss of the hole in that molding process can be avoided.

DESCRIPTION OF THE PREFERRED EMBODIMENT

Figure 1A:
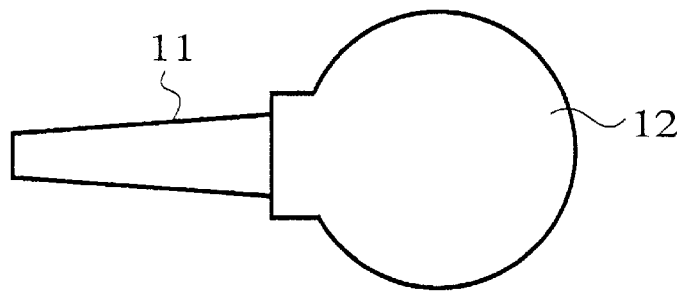
FIGS. 1A to 1C as a top view, a side sectional view and a bottom view, respectively, of an embodiment of the index for measuring instruments according to the present invention.
Figure 1B:
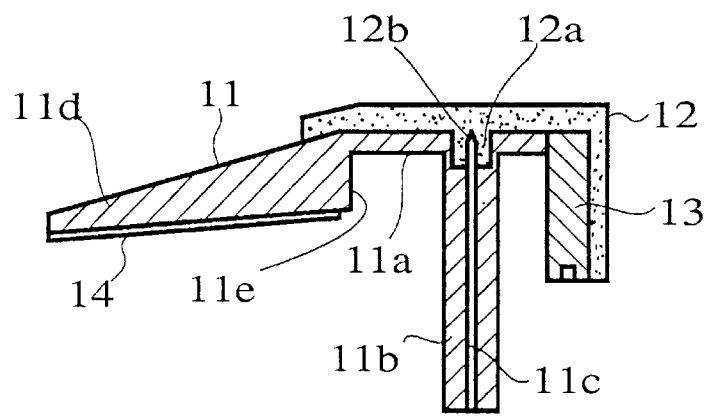
Figure 1C:
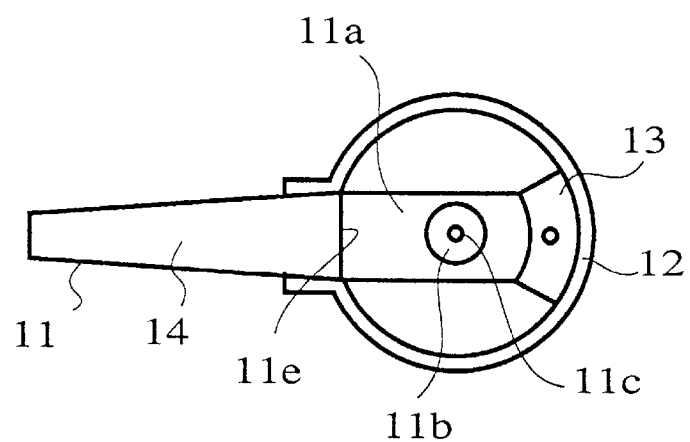

Hereinafter, one embodiment of the present invention will be described with reference to the drawings. FIGS. 1A to 1C show shows an embodiment of the index for measuring instruments according to this invention. In the drawings, reference numeral 11 designates a main body formed with a transparent synthetic resin, such as acrylic resin or polycarbonate resin, numeral 12 designates a cap formed with a non-transparent synthetic resin, such as acrylic resin, polycarbonate resin, ABS resin or polyacetal resin, and numeral 13 designates a balancer formed through injection molding with a thermoplastic resin, such as polypropylene, acrylic resin, polycarbonate resin, ABS resin or polyacetal in which a high specific gravity material, such as metallic or non-metallic powder, including lead, copper, zinc or ceramic powder, is kneaded. These parts are integrally formed into a multiple configuration. The particle diameter of the high specific gravity material depends on the synthetic resin in which that material is kneaded. However, it is generally 100 microns or less, preferably 50 to 60 microns.

Adjustment of the quality of the high specific gravity material, the kind of synthetic resin and/or the kneading ratio thereof can provide optional and easy adjustment of the index balance.

In the cap 12, skirt portion 11b is formed integrally with the main body 11, extending vertically downward from the base portion 11a. Further, a hole 11c is formed in the skirt portion 11b, in which the distal end of an index shaft of a measuring instrument (not shown) will be inserted and fixed.

The cap 12 is mounted on the base portion 11a of main body 11 to cover the top face and periphery of that portion. Namely, the balancer 13 is provided in the cap 12 on the opposite side of indicating portion 11d of the main body 11 over the skirt portion 11b. White, orange or red colored layer 14 is added onto the bottom of the indicating portion 11d. Further, light receiving face 11e for introducing light for illuminating the indicating portion 11d is provided at the base end of that portion 11d in parallel with the skirt portion 11b.

The cap 12 also includes portion 12a to be engaged with the main body 11 at a location corresponding to the skirt portion 11b. Moreover, one vertical face of balancer 13 is fitted tight on the inner surface of cap 12. Therefore, firmly fitted integral configuration of the main body 11, cap 12 and balancer 13 can be obtained.

Namely, the index according to this invention includes the transparent main body 11, skirt portion 11b provided at the base of main body 11 using the same material as that of main body 11, balancer 13 provided at the main body 11 on the side opposite to that of indicating portion 11d relative to the skirt portion 11b using a synthetic resin blended with a high specific gravity material, and cap 12 made of a non-transparent synthetic resin for covering the base of main body 11 and balancer 13. Further, the balancer 13 and main body 11 and skirt portion 11b are integrally formed into a multiple configuration.

Accordingly, there is no necessity of preparing these components separately and assembling them thereafter. Therefore, the manufacturing cost can be reduced by elimination of those processes. Additionally, unstable movement of the index to be caused by deviations and eccentricities in assembling these parts can be suppressed, thereby avoiding noises in the operation. Moreover, the integral forming of balancer 13 with the main body 11 and its skirt portion 11b, both of which are formed with the same material, can assure a mutual positional relation therebetween. Thus, the balance can be reproduced as designed. Also, the balance can be controlled without changing the shape and size of balancer 13 by adjusting the specific gravity of the high specific gravity material to be blended in the synthetic resin for forming that balancer 13 or by selecting the combination of specific gravities of the synthetic resin and high specific gravity material.

Because the cap 12 comprising a non-transparent synthetic resin is also molded integrally with the balancer 13 and the main body 11 and skirt portion 11b, there is no need to assemble the cap into the emission-type index. Therefore, the manufacturing cost can be reduced for the elimination of that process. Further, unbalance in the index structure and noise due to its unstable movement can be suppressed almost completely because deviations and eccentricities in the assembling process can be avoided.

Also, since the light receiving face 11e extending vertically downward in parallel with the skirt portion 11b is provided on the base of the main body 11 covered with the cap 12 to introduce light for illuminating the indicating portion 11d on the opposite side to the balancer 13 over the skirt portion 11b, the light can be introduced with high efficiency directly to the indicating portion 11d through the light receiving face 11e.

In this embodiment, hole 12b communicating with the hole 11c is formed in the portion 12a of cap 12 in association with the manufacturing method which will be described below.

Figure 2:
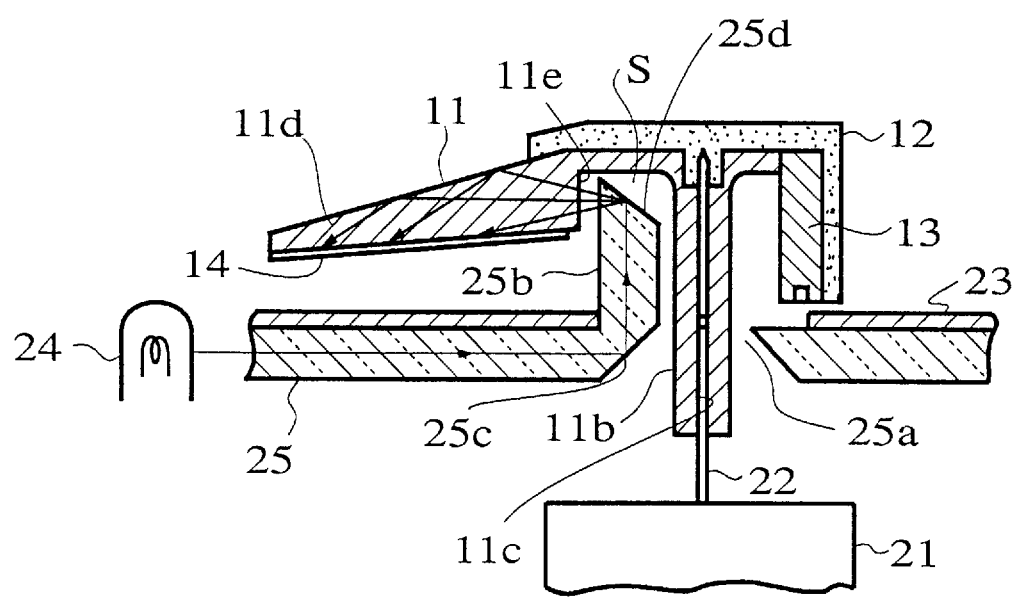
FIG. 2 shows an assembled state of the index of FIG. 1 in a measuring instrument.

As shown in FIG. 2, the index described above is fixed by inserting the distal end of shaft 22 in the hole 11c. The shaft 22 is a rotary shaft extending from movement element 21 of a measuring instrument for rotating within a predetermined angular range to display the measured value in cooperation with scale 23 placed between the movement element 21 and the index. On the bottom face of scale 23, light introducing plate 25 is placed to introduce light from light source 24. Light emitting piece 25b is raised around hole 25a of light introducing plate 25 through which the shaft 22 is inserted. The light emitting piece 25b extends into cavity S of the cap 12 and emits light reflected from its reflecting faces 25c and 25d so that the emitted light is received by the light receiving face 11e of main body 11. Thus, the light which passed through the light receiving face 11e illuminates the colored layer 14 via the indicating portion 11d.

Figure 3A:
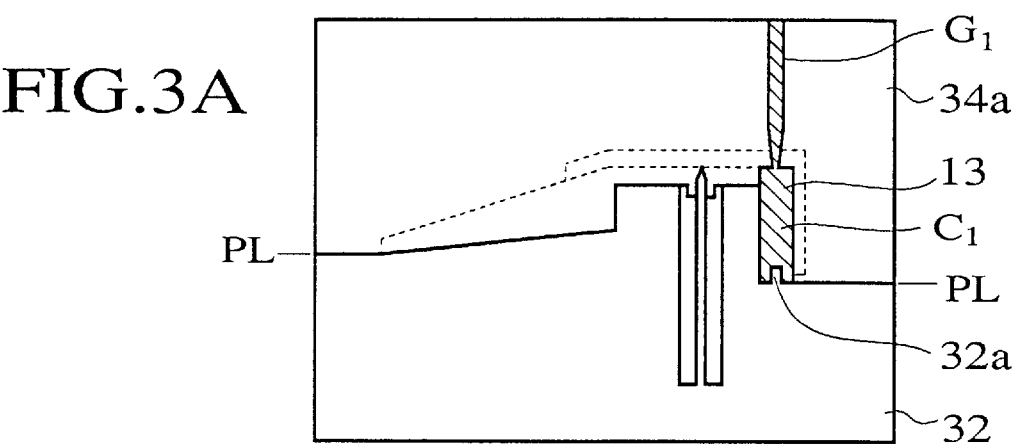
FIGS. 3A to 3C schematically stages of a method of manufacturing the index of FIG. 1.
Figure 3B:
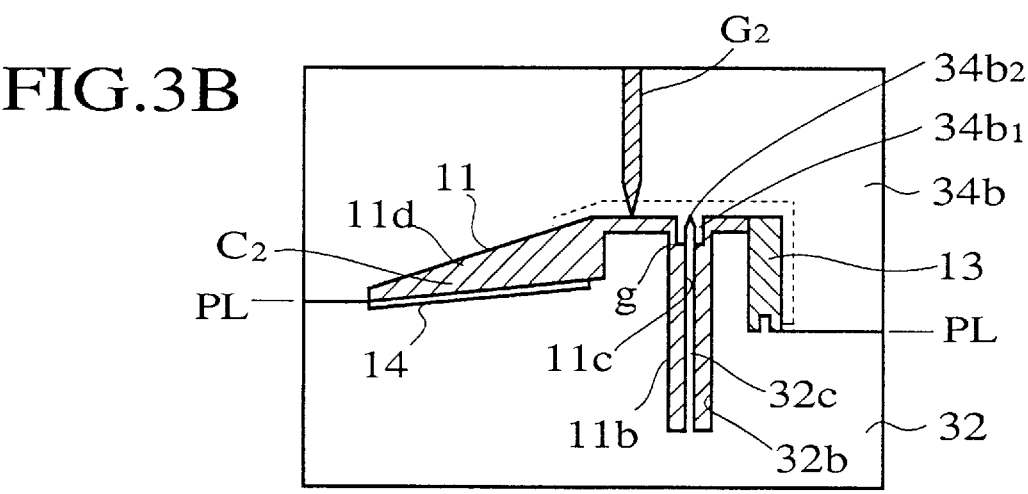
Figure 3C:
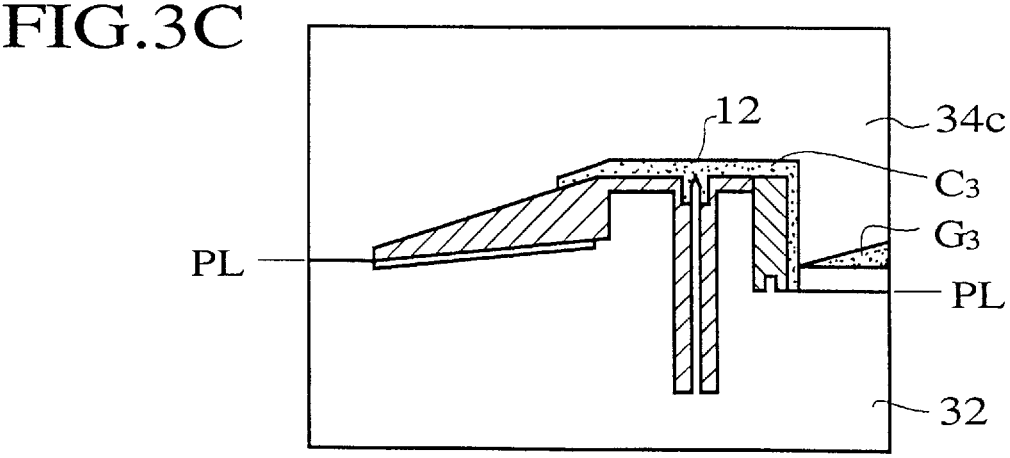

FIGS. 3A to 3C are cross-sections of a manufacturing arrangement respectively showing respective stages of a method of manufacturing the index of FIG. 1.

In the first stage designated by FIG. 3A, core mold 32 fixed on a vertically movable rotary table (not shown) is moved by elevation of that rotary table to contact with first cavity mold 34a fixed on the bottom face of another fixed table (not shown), thereby defining cavity C1 for forming the balancer 13. Then, a resin with which a high specific gravity material is kneaded is cast into the cavity C1 by an injection molding machine through gate G1 formed in the cavity mold 34a, thereby forming the balancer 13. Accordingly, the balance adjustment by the balancer 13 can be controlled, without changing the shape and size of cavity C1, merely by changing the quality of the high specific gravity material, the kind of resin, or the kneading ratio between these materials.

After the balancer 13 is formed by the first stage, the rotary table descends until the core mold 32 and cavity mold 34a are divided vertically at line PL. Then the core mold 32 on which the formed balancer 13 is placed is moved to the second stage by rotation of the rotary table by a predetermined angle. In the division of these molds, small projection 32a assures that the balancer 13 remains on the side of core mold 32.

After the movement to the second stage, the rotary table is elevated again so that the core mold 32 on which the balancer 13 is placed is mated with second cavity mold 34b fixed on a table (not shown) so as to form cavity C2 for forming the main body 11.

Then, resin is cast into the cavity C2 by an injection molding machine through gate G2 formed in the second cavity mold 34b, thereby forming the main body 11. In this molding, the face of the already formed balancer 13 to be in contact with the main body 11 forms a part of the cavity C2.

Also in the second stage, recess 32b for forming the outer face of skirt portion 32 and pin 32c provided in the recess 32b for forming the hole 11c of skirt portion 11b are provided in the core mold 32 so that the skirt portion 11b is formed integrally with the main body 11.

In the second cavity mold 34b, projection 34b1 is provided to form a recess by which a part 12a of the cap 12 will be formed to project into the main body 11. The projection 34b1 defines gap g to the recess 32b of core mold 32 in which resin for forming the main body 11 is cast. In the projection 34b1, pin receiving hole 34b2 is formed to receive the distal end of pin 32c so that the pin is not transformed by the flow of the resin to be cast into the cavity C2. The pin receiving hole 34b2 also works in the third stage for forming the cap 11 to prevent the molding sink in the portion of cap 12 corresponding to the projection 34b1.

In the second stage, colored layer 14 is also formed on the bottom face of indicating portion 11d. Namely, a paint layer or hot stamp layer to be the colored layer 14 is transferred by a transfer machine (not shown) onto the face of core mold 32 for forming the indicating portion 11d while the rotary table is rotated from the first stage to the second stage.

After the main body 11 is formed by the second stage, the rotary table descends until the core mold 32 and cavity mold 34b are divided vertically at line PL. Then, the core mold 32 on which the formed balancer 13 and main body 11 are placed is moved to the third stage by rotation of the rotary table by a predetermined angle.

After the movement to the third stage, the rotary table is elevated again so that the core mold 32 on which the balancer 13 and main body 11 are placed is mated with third cavity mold 34c fixed on a table (not shown) so as to form cavity C3 for forming the cap 12.

Then, resin is cast into the cavity C3 by an injection molding machine through gate G3 formed in the third cavity mold 34c, thereby forming the cap 12. In this molding, the face of the already formed balancer 13 and main body 11 to be in contact with the cap 12 forms a part of the cavity C3.

After the cap 12 is formed by the third stage, the rotary table descends, and a discharging pin (not shown) provided on the side of core mold 32 projects to release the index completely formed in a multiple configuration from the core mold 32. The index is then removed from the rotary table by a pick up arm (not shown).

Alternatively, the colored layer 14 may be formed on the top face of indicating portion 11d by transferring a paint layer or hot stamp layer onto the face of cavity mold 34b for molding the indicating portion 11d using a transfer machine provided at a location other than the rotary table and fixed table. Also, the main body may be formed with a colored transparent synthetic resin without employing the colored layer 14.

Further, the first stage for forming the balancer and the second stage for forming the main body 11 and skirt portion 11b may be replaced. Namely, the main body 11 and skirt portion 11b are formed in the first stage, and the balancer 13 is then formed in the second stage in which the formed main body 11 and skirt portion 11b are placed on the mold.

Figure 4:
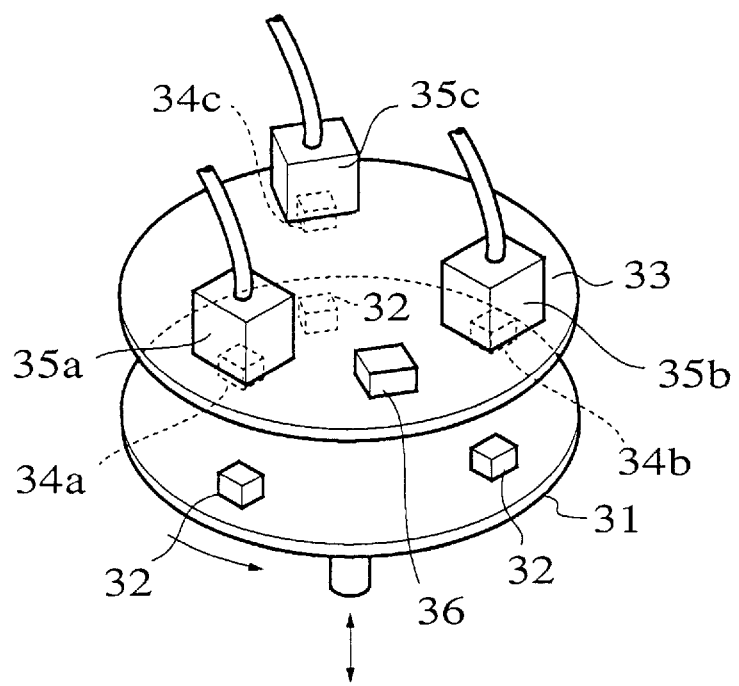
FIG. 4 is a diagram showing a machine for manufacturing the index in a multiple configuration according to the method of FIG. 3.

FIG. 4 shows an embodiment of a machine for forming an index by the multiple configuration method described above. In the same drawing, reference numeral 31 denotes a vertically movable rotary table on the top face of which three core molds 32 are mounted. Reference numeral 33 designates a fixed table which faces the rotary table 31. On the bottom face of fixed table 33, first to third cavity molds 34a to 34c are mounted in correspondence to respective ones of the core molds 32.

Further, first to third injection molding machines 35a to 35c are disposed on the top face of fixed table 33 in correspondence to respective ones of the first to third cavity molds 34a to 34c. The first to third injection molding machines cast resins through the gates G1 to G3 of the first to third cavity molds 34a to 34c and into the cavities C1 to C3 to be formed when the rotary table 31 is elevated so that the core molds 32 are mated with these cavity molds 34a to 34c, respectively.

Especially, the injection molding machine 35a for casting synthetic resin in which a high specific gravity material is blended to form the balancer is constructed to easily change the quality of the high specific gravity material, kind of the resin or the kneading ratio thereof. Accordingly, balance control can be carried out easily and optionally without changing the shape and size of cavity C1. For example, containers are prepared for containing a plurality of high specific gravity materials or synthetic resins possible to use. Then, materials supplied from the selected containers are kneaded together and cast into the cavity C1. Alternatively, one container is prepared for containing materials already weighed and kneaded. Then, the blended material is cast into the cavity C1 from the container.

Also, on the top face of fixed table 33, transfer machine 36 for transferring a paint layer on a predetermined portion of the core mold 32 is disposed between the second and third injection molding machines 35b and 35c so as to form the colored layer 14 on the bottom face of the indicating portion 11d of FIG. 2.

Accordingly, the first to third stages can be carried out successively by repeating the elevation of rotary table 31, resin casting by the injection molding machines 35a to 35b, and lowering of rotary table 31 for each rotation by a predetermined angle of rotary table 31 in the aforementioned machine. Therefore, the productivity of the index having a multiple configuration can be enhanced. For simplification, each stage shown in FIG. 3 processes only one index at a time. Actually, the machine employs molds, each of which can process a plurality of indexes at a time so as to further enhance the productivity and decrease the manufacturing cost. Moreover, the number of stages may be increased to four or more if the number of parts to be integrally formed into a multiple configuration exceeds three.

The emission-type main body 11 shown in FIG. 1 is covered with the cap 12 which is formed integrally with its base portion 11a. However, the cap may be formed separately from the integral structure comprising the main body 11, skirt portion 11b and balancer 13 to mount it on that structure when needed. Also in this case, the reproducibility of designed balance can be kept because the skirt portion 11d assures an accurate positional relation between the main body 11 and the balancer 13. Further, the balance can be controlled without changing the shape and size of balancer 13 by adjusting the specific gravity of the high specific gravity material to be blended in the synthetic resin for forming that balancer 13, or by selecting the combination of specific gravities of the synthetic resin and high specific gravity material.

As stated above, the present invention provides an index used for measuring instruments, comprising a balancer, main body and its skirt portion which are integrally formed into a multiple configuration.

Accordingly, there is no necessity of preparing these components separately and assembling them thereafter. Therefore, the manufacturing cost can be reduced as a result the elimination of those processes. Additionally, unstable movement of the index to be caused by deviations and eccentricities in assembling these parts can be suppressed, thereby avoiding noises in the operation.

Moreover, the integral forming of the balancer with the main body and its skirt portion, both of which being formed with the same material, can assure a mutual positional relation therebetween. Thus, the balance can be reproduced as designed. Also, the balance can be controlled easily and inexpensively without changing the shape and size of the balancer by adjusting the specific gravity of the high specific gravity material to be blended in the synthetic resin for forming that balancer, or by selecting the combination of specific gravities or blending ratio of the synthetic resin and high specific gravity material.

Also, in the emission-type index, there is no necessity of assembling the index cap. Therefore, the manufacturing cost can be further reduced as a result of that elimination. Additionally, unstable movement of the index caused by deviations and eccentricities in assembling the components can be suppressed, thereby to avoiding noises in the operation.

Further, a light receiving face extending vertically downward in parallel with the skirt portion is provided on the base of the main body covered with the cap to introduce light for illuminating the indicating portion with high luminance on the opposite side to the balancer over the skirt portion.

According to the method of manufacturing the index described above, the main body, skirt portion and balancer are integrally molded into a multiple configuration through a series of processes. Therefore, there is no necessity of preparing these components separately and assembling them thereafter, so that the reproducibility can be enhanced and the manufacturing cost can be significantly reduced. Further, unstable movement of the index caused by deviations and eccentricities in assembling these parts can be prevented, thereby avoiding noises in the operation.

Moreover, the integral forming of the balancer with the main body and its skirt portion, both of which are formed with the same material, can assure a mutual positional relation therebetween. Thus, the balance can be reproduced as designed. Also, the balance can be controlled without changing the shape and size of balancer by adjusting the specific gravity of the high specific gravity material to be blended in the synthetic resin for forming that balancer, or by selecting the combination of specific gravities or blending ratio of the synthetic resin and high specific gravity material.

Because the cap is also formed integrally with the main body, skirt portion and balancer into a multiple configuration through a series of molding processes, the process of preparing these components and assembling them thereafter can be eliminated. Therefore, the manufacturing cost can be reduced as a result of that elimination. Further, unstable movement of the index caused by deviations and eccentricities in assembling these parts can be prevented, thereby avoiding noises in the operation.

The series of molding processes include coloring of the indicating portion.

Finally, the shape of the mold according to this invention ensures holding of the mold pin for forming the hole in which the operational shaft from a measuring instrument will be inserted. Namely, transformation of the mold pin by the flowing pressure of the resin to be cast into the cavity for forming the main body and its skirt portion can be prevented by the shape of the mold. Therefore, even if the mold pin is relatively thin or the inner diameter of the hole to be formed by the pin is relatively small, loss of the hole in that molding process can be avoided.

What is claimed is:

1. An index for use in a measuring instrument, comprising:

a main body formed from a transparent synthetic resin and molded into a single, integral structure, said main body including a base portion having a first end and a second end, a skirt portion extending vertically downward from a substantially central point in said base portion, and an indicating portion for indicating measured values, said indicating portion extending substantially horizontally from said first end of said base portion;

balancer means connected to said second end of said base portion for adjusting a balance of said indicating portion, said balancer means comprising a synthetic resin blended with a material of high specific gravity and extending downward substantially parallel to said skirt portion; and cap means formed from a non-transparent synthetic resin and disposed on top of said base portion and said balancer means for covering said base portion and said balancer means, wherein said measuring instrument has an index shaft, and said skirt portion has a substantially central, longitudinally extending, hollow portion into which a distal end of said index shaft is inserted; and wherein said hollow portion of said skirt portion extends vertically along a length of said skirt portion from a bottom end of said skirt portion to a top end of said skirt portion and into said cap means.

2. An index for use in a measuring instrument, in which said measuring instrument includes:

a movement element movable in accordance with a measured value, a shaft extending from the movement element in a first direction for supporting the index, and a light introduction element adapted to maintain a position relative to the movement element, the light introduction element having a light emitting part provided with a light projecting piece facing outwardly in a radial direction relative to the shaft, the light projecting piece extending in a direction parallel to the first direction;

said index comprising:

a main body made of a transparent first resin, said main body including a skirt portion adapted to fit on the shaft, a base portion connected to an upper end of said skirt portion and extending in opposed radial directions so as to terminate in a first end and a second end of said base portion, said skirt portion being positioned between said first and second ends, and an indicator connected to said first end of said base portion and extending in the radial direction away from said first end, said indicator being adapted to illuminate as a result of introduction of a flux of light from an inner end of said indicator, said indicator indicating a visual position corresponding to the measured value;

a balancer made of a second resin consisting of the first resin and blended material having a specific gravity higher than a specific gravity of the first resin, the balancer being disposed on said second end of said base portion for balancing the indicator; and a cap made of a non-transparent third resin, said cap covering said base portion and said balancer;

wherein a light receiving face is formed on the inner end of the indicator and is positioned in parallel with the light projecting piece of the light emitting part; wherein said main body and said balancer form an integral molded resin structure, said cap is included within said integral molded resin structure, said integral molded resin structure is disposed around the skirt portion so as to define a space therebetween for accommodating the light emitting part of the light introduction element; wherein said space is defined by:

an outer circumference of the skirt portion;

an inner wall of said base portion formed with a reduced thickness;

the light receiving face;

an inner wall of said balancer; and an inner wall of said cap.

3. The index of claim 2, wherein said cap has, in a central region on an underside of said cap, a part of said cap fitted in said skirt portion and fitted on a distal end of the shaft.

4. An index for use in a measuring instrument, in which said measuring instrument includes:

a movement element movable in accordance with a measured value, a shaft extending from the movement element in a first direction for supporting the index and a light introduction element adapted to maintain a position relative to the movement element, the light introduction element having a light emitting part provided with a light projecting piece facing outwardly in a radial direction relative to the shaft, the light projecting piece extending in a direction parallel to the first direction;

said index comprising:

a main body made of a transparent first resin, said main body including a skirt portion adapted to fit on the shaft, a base portion connected to an upper end of said skirt portion and extending in opposed radial directions so as to terminate in a first end and a second end of said base portion, said skirt portion being positioned between said first and second ends, and an indicator connected to said first end of said base portion and extending in the radial direction away from said first end, said indicator being adapted to illuminate as a result of introduction of a flux of light from an inner end of said indicator, said indicator indicating a visual position corresponding to the measured value;

a balancer made of a second resin consisting of the first resin and blended material having a specific gravity higher than a specific gravity of the first resin, the balancer being disposed on said second end of said base portion for balancing the indicator; and a cap made of a non-transparent third resin, said cap covering said base portion and said balancer;

wherein a light receiving face is formed on the inner end of the indicator and is positioned in parallel with the light projecting piece of the light emitting part; wherein said light emitting part is accommodated in a space defined by:

an outer circumference of the skirt portion;

an inner wall of said base portion formed with a reduced thickness;

the light receiving face;

an inner wall of said balancer; and an inner wall of said cap.

5. The index of claim 4, wherein said cap has, in a central region on an underside of said cap, a part of said cap fitted in said skirt portion and fitted on a distal end of the shaft.

* * * * *